June 16, 1953  C. A. MORRISON ET AL  2,641,956
FILM-PERFORATION PITCH GAUGE
Filed Aug. 21, 1948  4 Sheets-Sheet 1

CHARLES A. MORRISON
FORDYCE M. BROWN
INVENTORS
BY
ATTORNEYS

June 16, 1953 C. A. MORRISON ET AL 2,641,956
FILM-PERFORATION PITCH GAUGE
Filed Aug. 21, 1948 4 Sheets-Sheet 2

CHARLES A. MORRISON
FORDYCE M. BROWN
INVENTORS

BY
ATTORNEYS

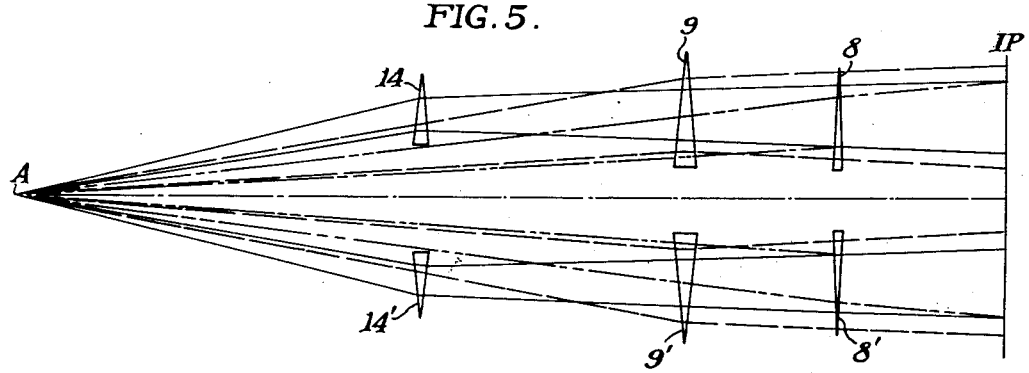
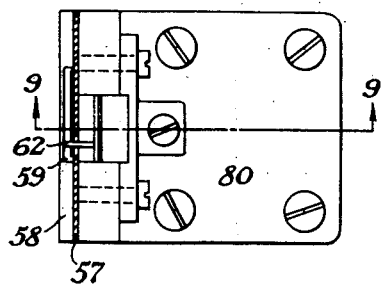
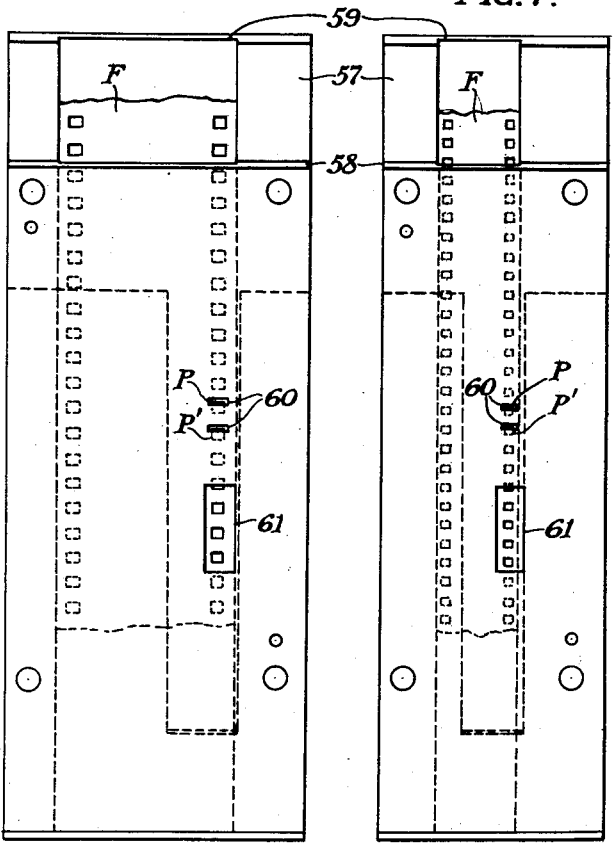
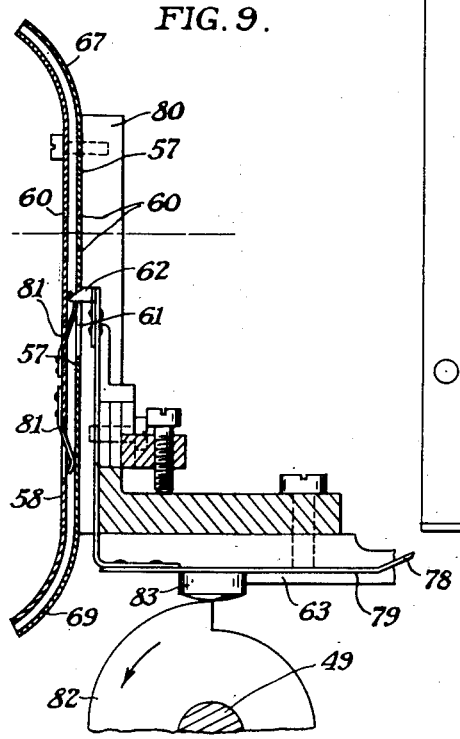
CHARLES A. MORRISON
FORDYCE M. BROWN
INVENTORS June 16, 1953  C. A. MORRISON ET AL  2,641,956
FILM-PERFORATION PITCH GAUGE
Filed Aug. 21, 1948  4 Sheets-Sheet 4
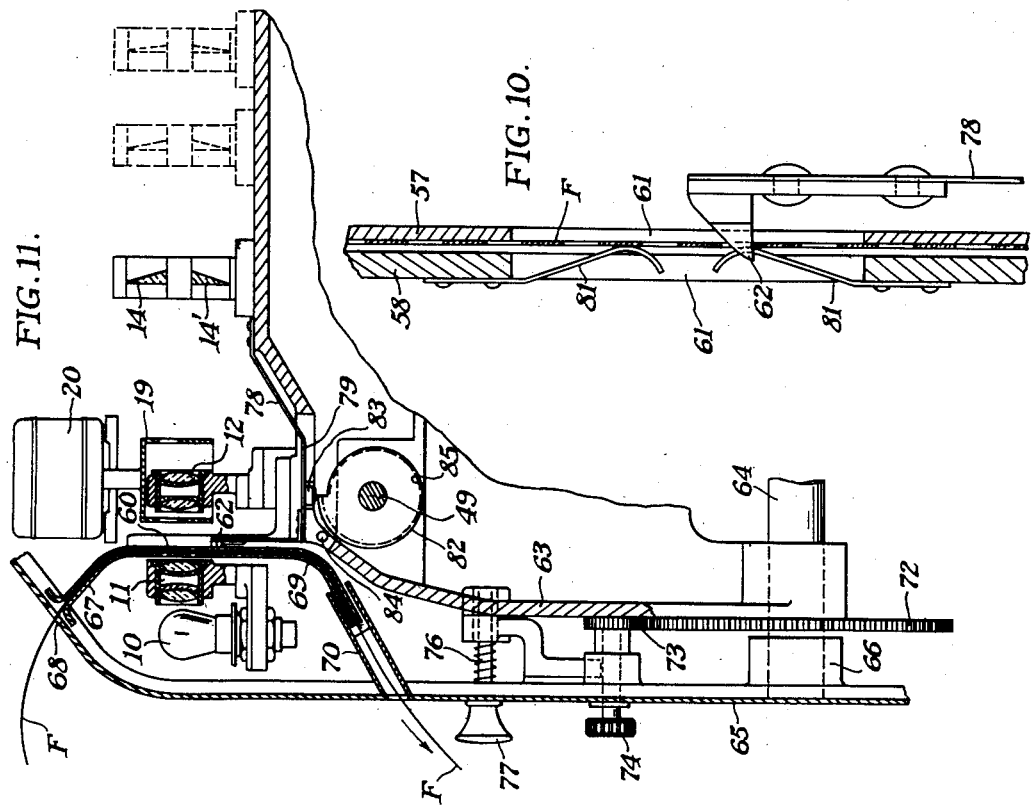
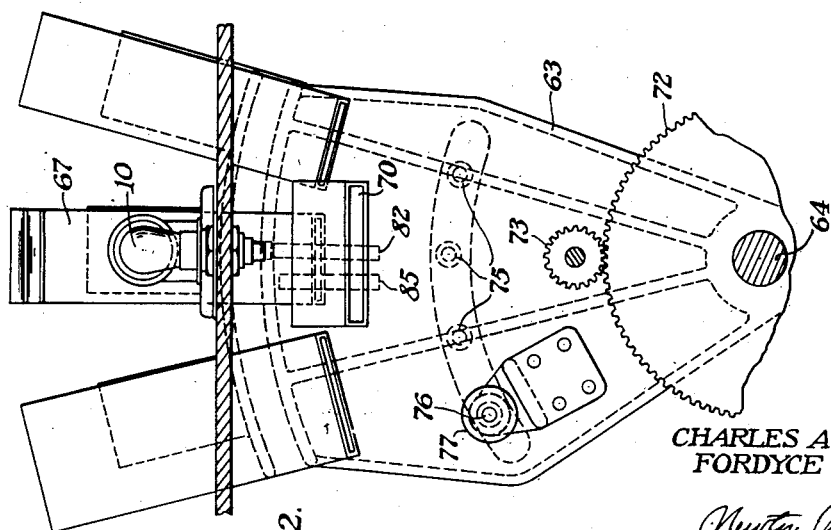
CHARLES A. MORRISON
FORDYCE M. BROWN
INVENTORS
BY
ATTORNEYS Patented June 16, 1953

2,641,956

UNITED STATES PATENT OFFICE 2,641,956

FILM-PERFORATION PITCH GAUGE

Charles A. Morrison, Rochester, and Fordyce M. Brown, Huntington Station, N. Y., assignors to Eastman Kodak Company, Rochester, N. Y., a corporation of New Jersey Application August 21, 1948, Serial No. 45,508

11 Claims. (Cl. 88—14)

The present invention relates to a gauge for measuring the pitch of the standard perforations now being produced on motion-picture films, and particularly to a gauge of this type which is automatic and rapid in response, and also adapted to handle all of the different width motion-picture films, the pitch of whose perforations vary from 0.150 to 0.300 inch.

In the production of motion-picture films, the steps of perforating the edges is a very critical one, particularly so far as the pitch of the perforations is concerned, because the proper feeding of the films through projection apparatus depends upon the engagement between the edges of the perforations and the teeth of a pull-down sprocket and/or pull-down claw. If the pitch of the film perforations exceeds quite rigid tolerances, the successive frames of the film are not properly and uniformly positioned in the gate of the projector and are projected on the screen with an unsteadiness which is very unpleasant.

While in the past means have been available for checking the pitch of film perforations against a standard value, such means have involved the personal judgment of an operator, have been too slow in response to be suitable for use in production control, and have not been of the recording type.

One object of the present invention is to provide a gauge for measuring the pitch of the perforations in a motion-picture film which is completely automatic in operation and rapid enough in response to be used in production control.

Another object of the present invention is to provide a film perforation pitch gauge which makes a permanent record of the pitch measurements of a series of perforations of a test strip of film as compared with a standard pitch value.

And another object is to provide a perforation pitch gauge of the type set forth which is adapted to handle a series of different width films, each having a different perforation pitch, by making a simple and ready change in the optical system of the instrument.

And still another object is to provide a perforation pitch gauge of the type set forth which makes use of interrelated electro-optical systems which are designed for extended trouble-free operation, which are not affected by fluctuations in power supply, and which will operate under production plant conditions of temperature, humidity, and vibration.

In a preferred embodiment of the present invention, two successive perforations of a standard motion-picture film are illuminated by light of substantially the same intensity. Images of each of the illuminated perforations, or at least portions of the perforations including corresponding edges of the perforations, are simultaneously projected on opposite ones of a pair of similar apertured masks normally spaced apart in the image plane in accordance with the standard value of pitch against which the film perforations are being checked. Corresponding edges of the masks form limiting stops on the same side of each image beam and limit the luminous flux passing the masks. If a pair of standard pitch perforations are imaged on the masks, and the masking edges of the apertures therein are at the proper separation as determined by an accepted standard steel tape, there will be equal luminous flux through both masks. However, if either a short or long pitched pair of perforations is imaged into the same mask set-up, the flux through one aperture will be less than that through the other, indicating that the pitch being measured is different from the standard value. While any suitable means can be used to compare the flux passing through the two apertures, light-sensitive cells are recommended to eliminate the personal judging element.

Since a certain amount of tolerance in the perforation pitch from the standard value is permitted, i. e., ±0.0003 inch, it is desirable to be able to tell how much a measured pitch varies from the standard, and in what direction. To this end we make one of the apertured masks adjustable relative to the other, so that if the flux in the two image beams transmitted by the masks is not equal, they can be made so by adjusting the one mask relative to the other in the proper direction. The amount and direction of adjustment required in the adjustable mask from its normal position is an indication of the amount and direction in which the perforation pitch being measured differs from the standard value.

To make the instrument automatic and recording, we measure the flux passing each mask with a light-sensitive means, and feed the output thereof into a phase-sensitive balancing control including a reversible motor arranged to adjust the adjustable mask in response to the output of said light-sensitive means in the proper direction and by the proper amount to equalize the flux passing through each mask aperture and after which balancing adjustment the motor stops. A recording apparatus including a movable stylus cooperating with a chart is associated with the mask-adjusting means to be moved relative to a reference line on the chart indicating a standard pitch value in accordance with the amount the pitch being measured differs from said standard value.

The novel features that we consider characteristic of our invention are set forth with particularity in the appended claims. The invention itself, however, both as to its organization and its methods of operation, together with additional objects and advantages thereof, will best be understood from the following description of specific embodiments when read in connection with the accompanying drawings, in which:

Fig. 5 is an enlarged ray diagram of that portion of the optical system between the exit side of the light-chopping drum and the common image plane of the projection lens and showing how different sets of light-bending means may be inserted into the respective image beams to adapt the gauge for measuring films having different standard perforation pitches;

Fig. 6 is an enlarged elevational view of a film gate adapted to guide a 35-mm. film into measuring position in the gauge;

Fig. 7 is an enlarged elevational view of a film gate adapted for guiding 8-mm. film;

Fig. 8 is an enlarged plan view of a film gate and pull-down claw combination and particularly showing the bracket for mounting the combination on a common indexable turret to permit moving the gates and pull-downs selectively into operative relation with the projection system;

Fig. 9 is a vertical section taken substantially on line 9—9 of Fig. 8;

Fig. 10 is an enlarged sectional detail of one of the film gates and showing how the pull-down claw engages the film to advance the same through the gate;

Fig. 11 is a vertical sectional view of the forward end of the gauge and showing how the gates and associated pull-down claws are mounted to be indexed into and out of operative position;

Fig. 12 is a front elevational view taken directly behind the front wall of the housing of the gauge and showing the turret for the several film gates and associated pull-down mechanisms and the indexing mechanism for the turret.

Like reference characters refer to corresponding parts throughout the drawings.

The instrument about to be described is intended to fill the need for an automatic gauge to measure the pitch of the standard perforations now being produced on 8-, 16-, and 35-mm. width films. This involves the measurement of three different pitch distances and involves three film widths. The gauge can be made to measure all three pitches with only minor changes in the optical system. The gauge is calibrated against an accepted standard steel tape and produces a permanent record of the pitch variations of the film under test. The electronic system is relatively simple and inherently stable.

Figure 1:
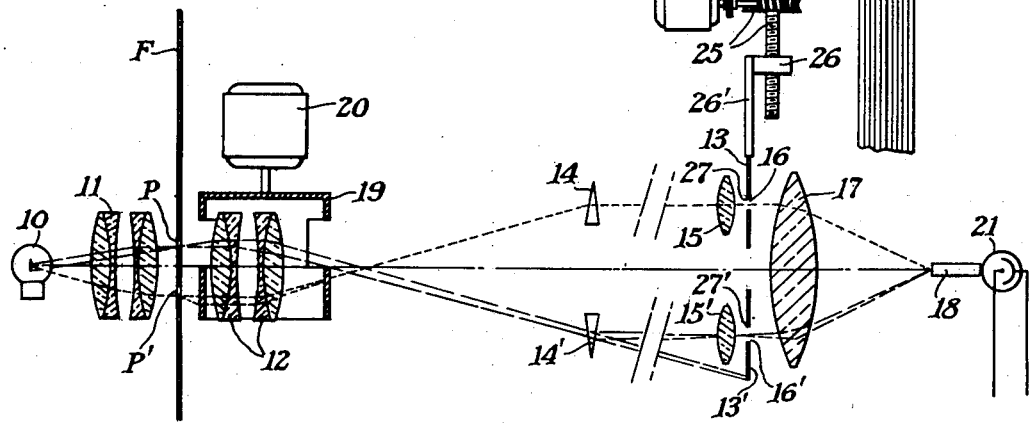
Fig. 1 is a schematic view showing the basic elements and their combination of a film perforation pitch gauge constructed in accordance with a preferred embodiment of the present invention.

Referring now to Fig. 1, the principle of operation of the gauge will now be described. Light from an 18-watt small coil filament lamp 10 is collimated by a condenser system 11. A pair of adjacent perforations P and P' in a stationary film F located in a collimated beam is imaged by an objective lens 12 onto a pair of apertured masks 13 and 13' at a suitable magnification, i. e., ten times. To reduce the separation between the perforation images, a light-bending means in the form of prisms 14 and 14' is introduced into each beam, each prism preferably being of such power that the beams emerge parallel to each other. Field lenses 15 and 15', one in each beam, direct the light beams separately through the apertures 16 and 16' in the masks 13 and 13', and a single lens 17 combines the halves of the system to produce a pair of coincident filament images on the end of the integrating rod 18. This rod may be made of plastic, glass or any other suitable material.

Figure 13:
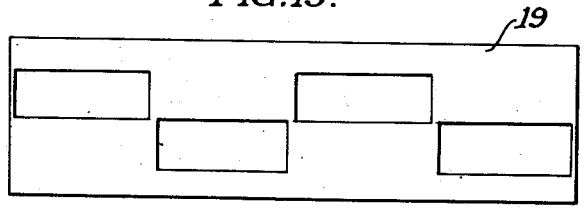
Fig. 13 is a developed view of the light-chopping drum showing the disposition of the apertures therein to produce the desired chopping effect.

A light-chopping drum 19 (here shown as surrounding the objective lens 12 and driven by motor 20) alternately exposes and obscures each beam of the optical system at the rate of 60 cycles per second. As clearly shown in Fig. 13, which is a developed view of the chopping drum, the periphery of the drum is provided with a plurality of staggered openings which serve to alternately pass first one, and then the other, light beam as the drum rotates. Alternate ones of the openings in the chopping drum are 180 degrees disposed relative to each other so that in one position of the drum one alternate pair of the openings pass one of the light beams, while the other beam is being interrupted by the shell of the drum and, in a successive position of the drum, during its rotation, the other pair of openings pass the other light beam, and the first-mentioned pair of openings is moved out of the optical system so that the first beam is interrupted. The speed of the motor 20 and the number of pairs of openings in the drum are such that one beam is cut on one-half of each cycle and the other is cut on the other half of the cycle so that the light from each is 180 degrees out of phase with the other. As shown in Fig. 1, the chopping drum is so situated in the optical system that its periphery intercepts the focal point of the objective lens 12 or is within the focal distance of the lens. This is necessary to obtain the desired alternate cut-off and passage of the two light beams.

The combined illumination on the integrating rod 18 is passed to a photoelectric receiver, shown here as a photoemissive cell 21, which is, in turn, connected to a follow-up system including a reversible two-phase motor 22. Any inequality in the relative amounts of light reaching the cell 21 from the two light beams will produce, due to the chopping drum, a pulsating current in said cell whose phase is determined by the relative magnitude of the amount of light reaching the cell from each beam. This current is amplified by any suitable A. C. amplifier, conventionally shown at 23, see Fig. 4, and the amplified current is fed to one phase of said reversible motor while the other phase of the motor is energized from a 110-v., 60 cycle source through leads 24. The phase of the pulsating light intensity and of the resulting amplified current depends upon whether the flux, through the aperture 16 in mask 13, is greater, or less, than the flux through the aperture 16' in mask 13' and determines the direction of drive of the motor 22.

The apertured mask 13 is mounted to be adjustable relative to the mask 13' so that, by adjusting the former, any inequality in flux through the two apertures can be accounted for. The balancing motor 22 is linked mechanically through a gear reduction and screw combination 25 (see Fig. 1) to a screw-driven nut 26 to which the movable apertured mask 13 is attached by an extension 26'. Thus, as the motor 22 drives, as the result of unequal amounts of flux passing the two masks, the mask 13 is adjusted relative to the mask 13' to mask off more or less of its light beam as required to balance the system. When a balance is achieved, the motor automatically stops because there is no longer an input to the phase thereof fed by the amplifier. The phasing of the light-chopping drum and the input to the balancing motor 22 are so arranged that any small change in flux through either mask is nullified by an appropriate change in the position of the adjustable mask 13.

Figure 2:
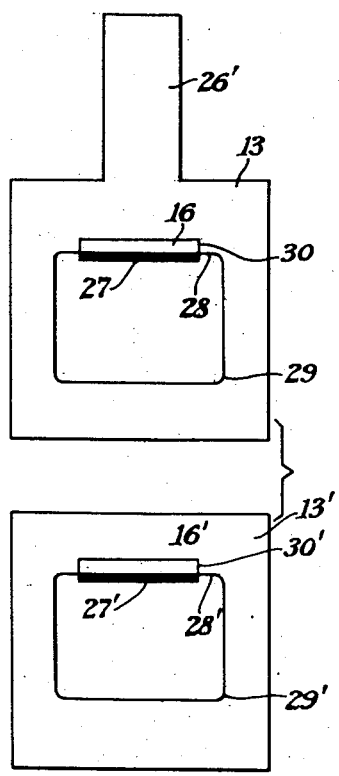
Fig. 2 is an enlarged elevational view of the apertured masks with a pair of film perforations imaged thereon, as they would be in the operation of the gauge, and showing how the corresponding edges of the apertures in each of the masks form limiting stops for corresponding edges of the perforation images.

Fig. 2 illustrates how this null balance principle is used in the measurement of perforation pitch. As shown, a pair of perforations whose pitch is to be measured are imaged on the respective apertured masks 13 and 13' so that corresponding edges 27 and 27' of the apertures 16 and 16' form limiting stops on corresponding edges 28 and 28' of the two perforation images 29 and 29', or on corresponding edges of each light beam. The corresponding aperture edges limit the flux as well and the shaded areas of Fig. 2 represent the flux transmitted through the two apertures. The horizontal or narrow edges 30 of the mask apertures 16 and 16' limit the measurement to the straight edge of the perforation images well away from the corner radii. Since the pitch of a pair of film perforations is the distance between corresponding edges of two successive perforations, we are interested in measuring only this edge spacing, and the apertures 16 and 16' of the masks are reduced to an area substantially less than that of the entire perforation image and are confined to the straight edge portion of the image. In this manner the measurement is not affected by differences in the radii of the corners of the perforations or irregularities in the other edges of the perforations which might tend to affect the amounts of light transmitted by the masks.

If there is a pair of standard pitch perforations imaged on the apertures of the masks and the masks are at the proper separation, there will be equal flux through both of them. This is true as well for any position of the film in the projection system which allows the measured edges to be imaged between the edges of the apertures 16 and 16' in the masks 13 and 13', respectively. Now, however, suppose either a short or long pitched pair of perforations is imaged into the same mask set-up. The flux through one mask aperture will be less than that through the other and the balancing motor will immediately drive the adjustable mask in the proper direction until a balance in the two light beams is restored. Thus, the movement of the adjustable apertured mask 13 is a direct indication of the perforation pitch.

In a specific set-up which we have found operative, an 1800 R. P. M. balancing motor 22 drove an 80-T. P. I. screw spindle through a 15:1 worm. Therefore, a 30-degree rotation of the spindle corresponded to 0.0001 inch on the film, and the balancing rate was in the order of 0.0001 inch in $\frac{1}{25}$ second. A permanent record may be produced by linking a recording mechanism to the spindle, as shown. This may comprise a rack 31 driven by a pinion 32 on the end of the screw spindle whereby said rack is adapted to be moved transversely across a recording tape 33 as the mask 13 is adjusted by the balancing motor. On the rack there is mounted a stylus 34 which is normally moved to a raised or inoperative position relative to the tape, and which is adapted to be moved into recording engagement with the tape upon energization of a solenoid 35, see Fig. 4. The recording tape includes a reference line 36 running centrally along its length and indicating a standard pitch value. Lines running along the tape on either side of the reference line indicate pitch variations in ± relation to the standard pitch value.

To adapt the recording mechanism for the measurement and recording of a plurality of pitches in succession, means are provided for intermittently advancing the tape beneath the stylus after each recording is made. We have shown this means as including a roller 37 in driving engagement with which the tape is held, see Fig. 4. This roller is intermittently advanced by a pawl and ratchet mechanism 38 which is operated upon energization of a solenoid 39.

The film of which the perforation pitch is to be measured is fed to the gauge in strips so that a plurality of perforation pitches are measured in succession. The film strips are located in the projection system by a gate and intermittently advanced through the gate after each pitch measurement by a claw pull-down mechanism including, and driven by, a motor 40. Typical gate and film pull-down mechanisms are shown in Figs. 6-12 and will be described fully hereinafter.

The cycle of operation of the gauge is as follows. The film strip to be measured is pulled into measuring position in the projection system by a claw at the exit side of the gate so that untouched perforations are measured. After the balance has been made, the recorder operates to record the pitch and then a new pair of perforations is pulled down into measuring position. This balance may either be assumed after a fixed time interval, as in the present case, or may be indicated by suitable electronic means whose criterion would be rotation of the balancing motor.

Figure 4:
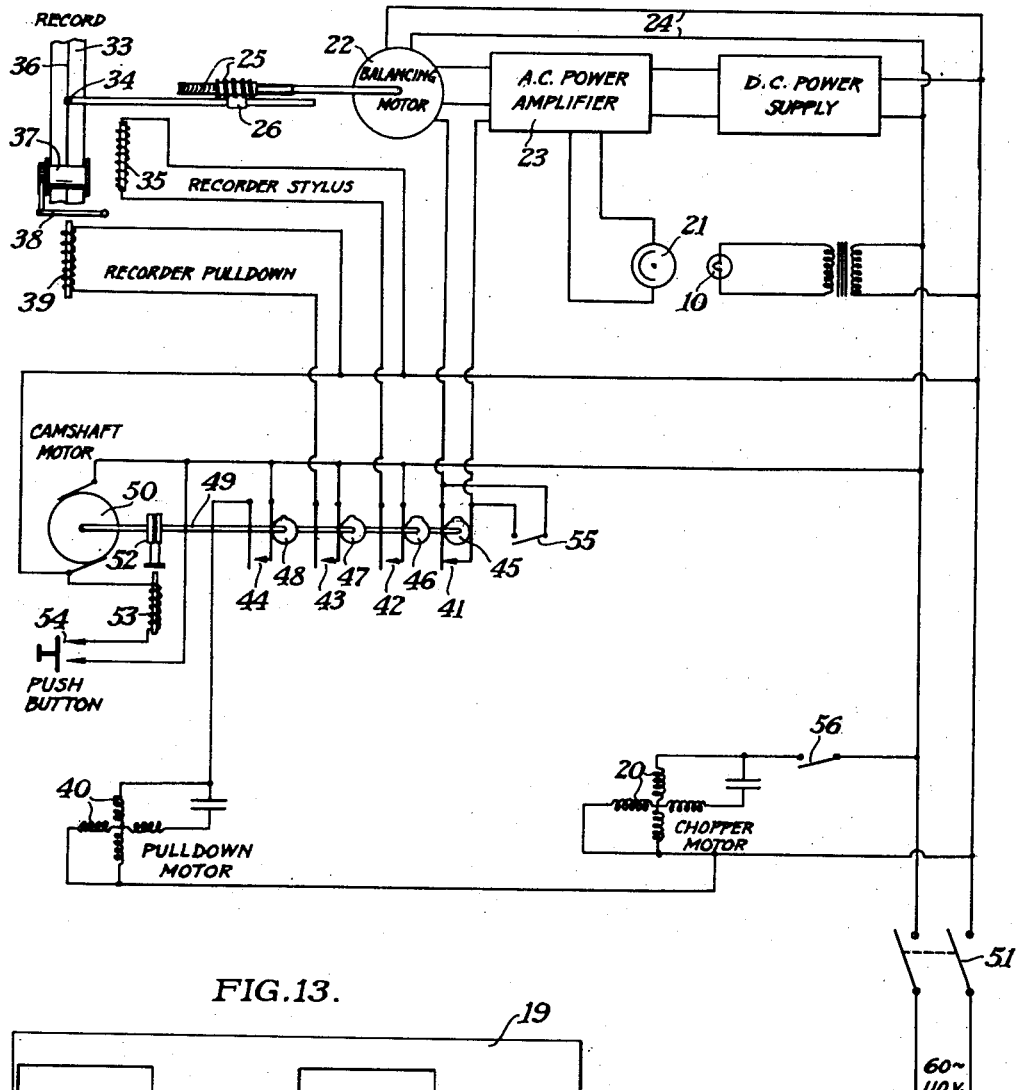
Fig. 4 is a schematic wiring diagram of the electric system of the gauge and the control circuit therefor.

This cycle of operation is automatically carried out by the control circuit shown in Fig. 4 which will now be described. As shown in Fig. 4, the line from the A. C. amplifier to the balancing motor includes a normally closed switch 41, the line to solenoid 35 for operating the stylus 34 includes normally open switch 42, the solenoid 39 for operating the recorder tape advancing mechanism is controlled by normally open switch 43, and the film pull-down motor 40 is controlled by normally open switch 44. These four switches are operated in proper sequence by a plurality of four cams—45, 46, 47, and 48, respectively, all mounted on a cam shaft 49 adapted to be driven by a cam shaft motor 50.

The cam shaft motor starts as soon as the main switch 51 in the supply line is closed and remains running all the time this switch is closed. The drive connection between the cam shaft motor 50 and the cam shaft consists of a clutch 52 operated by a solenoid 53, energization of which is controlled by a push button switch 54.

This control circuit is set up to operate on the fixed time interval, as mentioned above; the controlling fixed time being the time necessary for the light-balancing system to come to balance in making a measurement. Before using this instrument, it must be properly adjusted in accordance with a steel tape of standard pitch. This involves adjusting the apertured masks 13 and 13' with the steel tape in position until the balance system indicates equal flux through both masks. For this purpose the switch 41 is short-circuited by a manually operated push button switch 55. After the apertured masks 13 and 13' are properly adjusted to a zero position with a steel tape, the recording tape feeding mechanism is adjusted relative to the recording stylus in any suitable manner, not shown, to bring the zero reference line 36 thereon under the recording stylus 34. Then the chopper drum motor 20 must be brought into phase relation with the balancing motor 22 so that said balancing motor drives in the proper direction to correct any inequality in flux detected by the balancing system. This is accomplished by intermittently operating the manual phasing switch 56 in the circuit of the chopping drum and which switch is left closed after proper phasing is accomplished.

Figure 3:
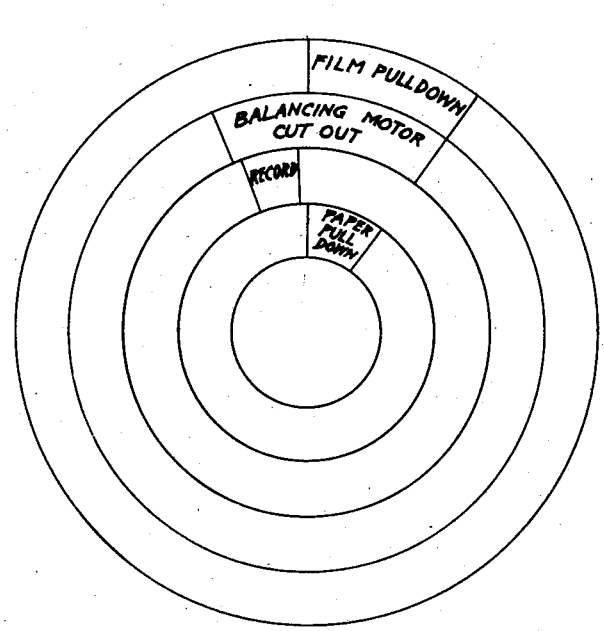
Fig. 3 is a cam chart showing the cycle of operation of the different parts of the complete gauge.

After the instrument is properly adjusted, the film strip to be measured is inserted in the gate and the push button 54 is depressed. This operates clutch 52 to connect cam shaft 49 to the motor 50 and the cycle of operation begins. Switch 44 is momentarily closed, first, to cause the pull-down to feed the film into measuring position. Switch 41 is then closed by cam 45 to connect the balancing motor to the A. C. amplifier at which time a measurement begins. After the balance is made, which is a fixed time characteristic of the balancing system used, cam 46 closes switch 42 to operate the stylus and then cam 47 closes switch 44 to advance the recording tape. The cam 48 then closes switch 44 again to advance a new pair of perforations into measuring position, and the cycle is repeated. The balancing motor is cut off during the time the film is being advanced so that the same will not tend to hunt while the cell is intermittently illuminated and darkened by the perforations moving through the projection system. Fig. 3 shows the cam chart for the cycling operation and it will be observed from this chart that about 270 degrees of the cam shaft cycle is available for the balancing operation.

The following table lists the perforation pitches a gauge of this type should be capable of measuring:

| Film | Pitch | Pitch Tolerance |
|---|---|---|
| | Inches | Inches |
| 8-mm. (16-mm. wide) | 0.1500 | ±0.0004 |
| 16 mm | 0.3000 | ±0.0004 |
| 35-mm | 0.1870 | ±0.0003 |

Provisions are made in this instrument for measuring all of the above films with only a minor change in the optical system which can be readily and directly accomplished.

Fig. 5 shows three pairs of interchangeable prisms which, when used one pair at a time, make this possible. In looking at Fig. 5, the point "A" is the focal point of objective 12 which is intercepted by the chopping drum, and plane IP is the image plane of the projection system in which the apertured masks 13 and 13' would ordinarily be located, see Fig. 1. At the left in Fig. 5 is a pair of approximately 16-degree prisms which converge the two image beams from the greatest or 0.3000 inch pitch to a path or reference line parallel to the objective axis and onto the image plane IP with a given separation. This pair of prisms are prisms 14 and 14' shown in Fig. 1, and used when measuring 16-mm. films. The intermediate pair of 11-degree prisms 9 and 9' converge the 0.1870-inch pitch images along the same reference line to the same center distance in the image plane. The pair of 4-degree prisms 8 and 8' do the same for the 0.1500-inch pitch. Slight adjustments in the prism position along the axis in the initial alignment of the gauge makes possible precisely the same center separation for all three sets of perforation images on the apertured masks and thus no zero shift need be introduced with a change in prisms. It is not necessary that the several sets of prisms be of such refracting power as to bend each of the image rays to a reference light parallel to the optical axis of the objective as shown. They could just as well be of such power and disposition as to converge the beams toward the optical axis, so long as each prism will direct its corresponding beam along the same reference line or path to the image plane or apertured masks located therein.

Separate gates are, of course, required to handle the different film widths and perforation pitches associated therewith, and each gate has an associated film pull-down mechanism having a pull-down stroke corresponding to the pitch of the film accommodated by the gate, so that upon successive strokes of the pull-down claw a new pair of film perforations are moved accurately into the projection system of the gauge. In accordance with the present invention, the several gates, their associated pull-down mechanisms, and the corresponding pairs of prisms are so mounted on an indexable turret mechanism that any combination of gate, pull-down, and refracting system can be selectively moved into operative position in accordance with the type of film to be measured.

To this end, the present gauge is constructed in accordance with the showings of Figs. 6–12 which will now be described in detail. The several gates are structurally alike and differ only in certain dimensions of parts, as shown in Figs. 6 and 7, wherein, in Fig. 6, a gate for a 35-mm. film is shown, and in Fig. 7 a gate for accommodating 16-mm. film is shown. In each instance the gate comprises a pair of plates 57 and 58 fastened in face-to-face relation so that a groove 59 in each, corresponding in width to the film being accommodated, form a guiding slot through which the film moves. Each gate includes a pair of apertures 60 spaced equally on opposite sides of the optical axis of the instrument and spaced apart a distance corresponding to the pitch of the perforations in the film to be accommodated so that successive perforations will be aligned with opposite ones of said apertures. The spacing of the apertures in the 35-mm. gate will be 0.1870 inch, while that in the 16-mm. gate will be 0.3000 inch, and that in the 8-mm. gate will be 0.1500 inch. Each gate is also provided with an elongated aperture 61 in line with one row of perforations to accommodate the film claw 62 of the pull-down mechanism, see Figs. 9 and 10.

Each of the film gates is fixed to and arcuately spaced around an indexing turret member 63 which is rotatably mounted on a horizontal shaft 64 fixed to and extending between two walls of a housing enclosing the instrument. Only the front wall 65 of the housing is shown in Fig. 11 with one end of the shaft 64 supported in a bearing portion 66 attached thereto. The upper and lower ends of the gates are curved forwardly, as shown in Figs. 9 and 10; the upper end 67 being adapted to move into alignment with a slot 68 in the housing through which a film strip F to be measured is introduced, the lower end 69 being adapted to move into alignment with a chute 70 in the front wall of the housing through which the film comes out as it is fed through the gate by the pull-down claw. As the turret member 63 is indexed, the respective film gates are moved into operative position with respect to the projection system including lamp 10, condenser lens 11, objective lens 12, and apertured masks 13 and 13', not all shown in Fig. 11; all of which parts are mounted on supports in fixed relation with the housing. Also mounted on a rearwardly extending portion of the turret member are the three pairs of prisms 14, 14', 9 and 9', and 8 and 8'. It will be appreciated that each pair of prisms is mounted on the turret member in proper optical alignment with the gates with which they are associated, so as to be moved into the optical system at the same time as their corresponding gate is introduced into the system. In Fig. 11, the three sets of prisms are shown as being in the optical system for the purpose of showing their relative spacing when in operative position. The two pairs of prisms which do not correspond with the gate in position, however, are shown in dotted lines to indicate that they are not all in position at any one time.

For selectively indexing the different gates and prism pairs into position, the following structure is provided. Fixed to the bearing of the turret member 63 is a spur gear 72 which is engaged by a pinion 73 arranged to be rotated by a knob 74 extending through the front wall of the housing. The vertical portion of the turret member includes a plurality of spaced locating holes 75 into which the end of a spring-pressed pin 76 is adapted to snap to locate the turret with different ones of the gates in operative position relative to the optical system. The locating pin 76 is provided with a knob 77 which may be grasped by hand to withdraw the pin, after which the turret may be oscillated by rotating knob 74 until the pin snaps back into a locating hole to lock the turret against movement. A suitable index mechanism, not shown, may be provided on the front of the housing in conjunction with the knob 74 to indicate which gate is in operative position.

Inasmuch as the pull-down stroke for each film is different, namely, equal to the pitch of the perforations of the film, we find it desirable to provide each gate with its own pull-down mechanism which is indexed into-and-out-of position with the respective gates. Inasmuch as each pull-down mechanism for the several gates is alike in structure, only one will be described. The pull-down mechanism comprises a claw 62 riveted or otherwise fastened to the upper end of the vertical portion of a bent spring member 78 fastened at its other end to the horizontal portion of the turret member. This spring member is formed downwardly so that the horizontal portion 79 thereof passes beneath the support 80 for the gate member, see Fig. 8, and the spring is biased to pull the claw downwardly. The tension in this spring member is relied upon for the pull-down stroke of the claw and the spring is strong enough for this purpose because the film is only under the tension of two light springs 81 in the gate which act to hold the film in a given plane against the rear gate member.

The return, or upward stroke of the claw is effected by a cam 82 adapted to engage a stud 83 on the lower side of the horizontal portion of the spring member. The pitch of this cam is slightly greater than the pitch of the film perforations being measured so that it raises the claw a sufficient distance to engage the succeeding perforation on its next downward stroke. The claw is of the ratchet type and its upper edge is inclined as shown in Fig. 10, so that it can readily ratchet out of the engaged perforation when the cam drives it upwardly. The length of the downward stroke of the claw, in order to accurately position two successive perforations in alignment with the apertures 60 in the gate, is limited by a fixed stop 84 on the turret associated with that particular pull-down mechanism. The stop 84 for each claw will vary in position because the pull-down stroke for the different films will vary as their perforation pitches.

One cam having a pitch of slightly more than 0.3000 inch will suffice for the film gates adapted to accommodate 16- and 35-mm. films which have perforation pitches of 0.3000 and 0.1870 inch, respectively. However, since an 8-mm. film has a perforation pitch of 0.1500 inch or one-half of that of the 16-mm. film, if the same cam were used in this pull-down, the pull-down would skip a perforation upon each stroke. Accordingly, for the 8-mm. film, a second pull-down cam 85 is provided which has a pitch slightly greater than 0.1500 inch. This cam is disposed on the same shaft as cam 82, but is located to one side thereof. See Fig. 12. The indexing means for the turret member 63 is so arranged that when the gates for 16- and 35-mm. films are indexed into position, the pull-down claw associated therewith is moved into operative relation with cam 82. On the other hand, when the 8-mm. gate is indexed into position, the pull-down claw associated therewith is brought into operative relation with the other cam 85. It will be understood that the two pull-down cams 82 and 85 are rotated by pull-down motor 40, see Fig. 4, which drives the shaft on which the cams are mounted through a single revolution each time the motor is energized.

While an electro-optical system, such as we have illustrated, is preferable because it uses a light chopper rather than a mechanical converter to obtain an A. C. input to the amplifier from the measuring cell, along with the fact that it uses a single measuring cell for both beams rather than two separate cells, it is to be understood that it is not the only system which could be used with the present gauge in order to obtain the desired result. For instance, each film perforation could be imaged on the apertured masks 13 and 13' by a separate optical system and the flux passing through each mask could be measured by a separate photocell. Now, if these two photocells were hooked in a closed loop circuit in bucking relation, an output from this loop circuit would indicate an unbalance in the flux striking the photocells and the polarity of the output would indicate which cell was receiving the most flux. To make the output of this loop circuit control a follow-up system similar to that described above, and including a 2-phase reversible motor, one line of the loop output could be connected to the secondary of an input transformer, and the other would be connected to the vibrator of a mechanical converter; the energizing coil of the converter and the primary of the input transformer being connected to the same A. C. source as one phase of the reversible motor. The A. C. output from the transformer would then be fed into an amplifier whose output would, in turn, be connected to the other phase of the reversible motor. Since this last-described detector and follow-up system is well known per se, being shown in publications including U. S. Patent 2,300,742, issued November 3, 1942, and the Technical Journal entitled "Instrumentation" (Instrument Technology) vol. I, No. 1, 1943, pp. 7-12 (incl.), a detailed showing, or description, thereof is not deemed necessary herein.

In its broadest aspect, the present invention is not limited to the use of a recording mechanism or the use of the described follow-up systems for making the gauge automatic. For example, if one were interested only in discovering when the pitch of a pair of perforations was not equal to a standard pitch value, exclusive of a range of tolerances, the output of the measuring cell, or cells as the case may be, could be connected to a visible meter or a scale associated therewith which would indicate an unbalance in flux in the two light beams. On the other hand, the measuring cell, or cells, as the case may be, could be connected to an audible signaling device which would notify the operator of an unbalance in the light beams and, consequently, a discrepancy between the perforation pitch being measured and a standard pitch value.

Although we have shown and described certain specific embodiments of our invention, we are aware that many other modifications thereof are possible. Our invention, therefore, is not to be limited to the precise details of construction shown and described but is intended to cover all modifications coming within the scope of the appended claims.

Having thus described our invention, what we claim as new and desire to secure by Letters Patent of the United States is:

1. A film-perforation gauge comprising means for holding a perforated film strip stationary in a flatwise and extended condition in a given plane, means for simultaneously illuminating adjacent perforations of said film strip with light of the same intensity, an optical projection system for projecting an image of each of said perforations in the same plane in spaced relation corresponding with the pitch of said perforations, a pair of similar apertured masks located in the image plane of said projection system in spaced relation to have projected thereon opposite ones of the perforation images the aperture in each of said masks being smaller in area than the perforation images and said apertures spaced apart by a distance such that corresponding edges of the two apertures correspond to a standard pitch value and mask corresponding edges of the two perforation images, whereby each aperture will pass a certain amount of light depending upon the separation of the corresponding edges of said apertures relative to the separation of the corresponding edges of the two images masked thereby, and the amount of light passing each aperture will be equal if the perforation pitch being measured is equal to the standard pitch value, and means for measuring and comparing with one another the amounts of light passing through each of said apertured masks.

2. A film perforation gauge comprising means for simultaneously illuminating adjacent perforations of a stationary film with light of the same intensity, an optical projection system for projecting an image of each of said perforations in the same plane in spaced relation in accordance with the pitch of said perforations, a pair of similar apertured masks located in the image plane of said projection system in spaced relation to have projected thereon opposite ones of said perforation images, the aperture in each of said masks being smaller in area than the perforation images and said apertures spaced apart by a distance such that corresponding aperture edges mask corresponding edges of the two perforation images, whereby each aperture will pass a certain luminous flux depending upon the separation of the corresponding edges of said apertures relative to the corresponding edges of the two images masked thereby, means for measuring the luminous flux passing through each aperture, one of said masks being adjustable toward and from the other to shift the aperture therein to balance the luminous flux passed by each of the two apertures, and means connected with the adjustable mask to be moved by adjustment of said mask and for indicating by its adjusted position how the pitch of the film perforations being measured compares with a standard film pitch.

3. A film perforation gauge according to claim 2, in which the light measuring means includes a photoelectric circuit, a reversible motor for adjusting said adjustable apertured mask, and means for interconnecting said photoelectric circuit and reversible motor so that the motor will be driven in the proper direction and by the proper amount in response to an output of said photoelectric circuit, caused by an unbalance in the luminous flux passing through said two apertures, to adjust the adjustable mask and balance the amount of light passing through the two apertures.

4. A film perforation gauge comprising means for holding a perforated film strip stationary in a flatwise and extended condition in a given plane, means for simultaneously illuminating perforations of said film strip with light of the same intensity, an objective for receiving light from the two perforations, for directing two beams of light corresponding respectively to the two perforations and for forming spaced images of the two perforations in an image plane, a pair of similar apertured masks located in the said image plane in spaced relation to have projected thereon opposite ones of the perforation images, the aperture in each mask being smaller in area than the perforation image and said apertures spaced apart by a distance such that corresponding edges of the two apertures mask corresponding edges of the two perforation images, whereby each aperture will pass an amount of luminous flux dependent upon their spacing and the pitch of the film being gauged, and means for comparing the luminous flux passing through the two apertures with one another.

5. A film perforation gauge according to claim 4, in which one of said apertured masks is adjustable relative to the other transversely of the optic axis of said objective to equalize the luminous flux passing through said apertures, and means operatively connected with said adjustable mask for indicating by the adjusted position of said mask how the pitch of said perforations being gauged compares with a standard film pitch.

6. A film perforation gauge comprising means for holding a perforated film strip stationary in a flatwise and extended condition in a given plane, means for simultaneously illuminating successive perforations of said film strip with light of the same intensity, means for projecting enlarged images of said perforations in a common image plane in spaced relation less than that corresponding to the magnification involved and comprising an objective for receiving light from the two perforations and for directing two divergent beams of light toward the image plane corresponding respectively to the two perforations, and light bending means in each beam for bending the beam toward the optic axis of said objective and along a reference axis to the common image plane, a pair of similar apertured masks in said common image plane in spaced relation to have projected thereon opposite ones of the perforation images with corresponding edges of the perforation images masked by corresponding edges of the apertures therein, said masks normally spaced apart by a distance such that the masking edges of the apertures therein are spaced in accordance with a standard film pitch whereby equal amounts of luminous flux will be transmitted by both apertures when the perforations being gauged are equal to a standard pitch, and means for comparing the luminous flux passing through the two masks with one another.

7. A film perforation gauge according to claim 6 including a second set of light-bending means adapted to be moved into said divergent light beams instead of said first-mentioned set for accommodating said gauge to the measurement of a different perforation pitch, each of said second set of light-bending means having a refractive power and location in the divergent light beams as to bend the beams from said perforations of different pitch along the same reference axis as the first set of light-bending means to said apertured masks.

8. A film perforation gauge according to claim 6 in which said film strip holding and positioning means includes a gate for positioning a film, having one perforation pitch, in the projection system, and second gate for positioning a film having a different perforation pitch, said gates mounted to be selectively moved to and from the projection system, a second set of light-bending means adapted to be moved into said divergent light beams instead of said first-mentioned set when said second gate is in projecting position, each of said second set of light-bending means having a refractive power and location in the divergent light beams as to bend the beams from said perforations of different pitch along the same reference axis as the first set, each of said sets of light-bending means mounted to be selectively moved into and out of said projection system.

9. A film perforation gauge according to claim 6 in which said film strip holding and positioning means includes a gate for positioning a film having one perforation pitch in the projection system, and a second gate for positioning a film having a different perforation pitch, said gates mounted to be selectively moved to and from the projection system, a second set of light-bending means adapted to be moved into said divergent light beams instead of said first-mentioned set when said second gate is in projecting position, each of said second set of light-bending means having a refractive power and location in the divergent light beams as to bend the beams from said perforations of different pitch along the same reference axis as the first set, each of said sets of light-bending means mounted to be selectively moved into and out of said projection system, and an operative connection between said mounting means for the two gates and said mounting means for the two sets of light-bending means whereby when one gate is moved into the projection system the set of light-bending means corresponding to the pitch of the perforations of the film accommodated by said gate is simultaneously moved into the projection system while the other gate and set of light-bending means is removed from the system.

10. A film perforation gauge comprising means for simultaneously illuminating adjacent perforations of a stationary film with light of the same intensity, an optical system for imaging each of said perforations in a common image plane in spaced relation in accordance with the pitch of said perforations, a pair of similar apertured masks located in said common image plane in spaced relation whereby each one thereof has a separate one of said perforation images projected thereon with corresponding edges of the perforation images in overlapping relation with, and masked by, corresponding edges of the apertures in the masks, one of said apertured masks adjustable to and from the other for the purpose of balancing the luminous flux transmitted through the separate apertured masks, a light-sensitive cell, optical means for directing the luminous flux transmitted by each of said apertured masks onto said light-sensitive cell, means for intermittently intercepting the separate image beams in front of the light-sensitive cell in opposite phase relationship, whereby the cell is alternately effected by one beam and then the other, a reversible motor for adjusting said adjustable mask, and means responsive to variations in the output of said light-sensitive cell caused by variation in the luminous flux of the two beams for automatically causing the operation of said motor in the proper direction and to the proper extent to adjust said adjustable mask to equalize the luminous flux transmitted by each mask, and means operatively connected with said adjustable mask for indicating by the adjusted position of the mask how the perforation pitch being gauged compares with a standard value.

11. A film perforation gauge according to claim 10 including an A. C. amplifier into which the output of the light-sensitive cell is fed, and in which said reversible motor is a two-phase motor, with one phase connected to a supply of A. C. current of a given frequency and the other phase connected to the amplifier output, and in which said light beam interrupter obscures each beam at the same frequency as the A. C. input to said motor, and the phasing of the interrupter and input to the motor is so arranged that any change in luminous flux through either mask is nullified by an appropriate change in the adjustable mask by the motor.

CHARLES A. MORRISON.
FORDYCE M. BROWN.

References Cited in the file of this patent

UNITED STATES PATENTS

| Number | Name | Date |
|---|---|---|
| 500,775 | Parenthou | July 4, 1893 |
| 1,486,226 | Capstaff et al. | Mar. 11, 1924 |
| 1,807,737 | Goldhammer | June 2, 1931 |
| 1,894,132 | Stone | Jan. 10, 1933 |
| 1,963,128 | Geister | June 19, 1934 |
| 2,087,250 | Foster | July 20, 1937 |
| 2,157,389 | Park | May 9, 1939 |
| 2,192,987 | Runge | Mar. 12, 1940 |
| 2,219,775 | Harrison | Oct. 29, 1940 |
| 2,237,811 | Cockrell | Apr. 8, 1941 |
| 2,247,214 | Wagar | June 24, 1941 |
| 2,289,551 | Reason | July 14, 1942 |
| 2,290,606 | Burnett | July 21, 1942 |
| 2,333,758 | Xenis et al. | Nov. 9, 1943 |
| 2,351,337 | Houston | June 13, 1944 |
| 2,360,298 | Woodson | Oct. 10, 1944 |
| 2,363,964 | Howson et al. | Nov. 28, 1944 |
| 2,375,665 | Koulucovitch | May 8, 1945 |
| 2,376,311 | Hood | May 15, 1945 |
| 2,385,503 | Glasser | Sept. 25, 1945 |
| 2,396,510 | Hulst | Mar. 12, 1946 |
| 2,398,904 | Libman et al. | Apr. 23, 1946 |
| 2,408,512 | Gradisar | Oct. 1, 1946 |
| 2,410,094 | Martinec | Oct. 29, 1946 |
| 2,421,499 | Guedon | June 3, 1947 |
| 2,439,373 | Stearns | Apr. 6, 1948 |
| 2,444,639 | Elder | July 6, 1948 |
| 2,457,170 | Mitchell | Dec. 28, 1948 |
| 2,461,166 | Luboshez | Feb. 8, 1949 |
| 2,466,161 | Doll | Apr. 5, 1949 |